United States Patent

[11] 3,615,342

| | | |
|---|---|---|
| [72] | Inventor | Conrad B. Bare<br>Coopersburg, Pa. |
| [21] | Appl. No. | 854,357 |
| [22] | Filed | Aug. 27, 1969 |
| [45] | Patented | Oct. 26, 1971 |
| [73] | Assignee | Bethlehem Steel Corporation |

[54] PROCESS FOR PRODUCING IRON ORE PELLETS OF LOW ALKALI CONTENT AND CONTAINING FLUX MATERIAL
7 Claims, No Drawings

[52] U.S. Cl. .................................................... 75/1, 75/101, 75/114
[51] Int. Cl. .................................................... C22b 1/08, C22b 3/00
[50] Field of Search ........................................ 75/1, 113, 3, 7, 85, 101, 114

[56] References Cited
UNITED STATES PATENTS

| | | | |
|---|---|---|---|
| 1,571,502 | 2/1926 | Brown | 75/114 |
| 2,369,349 | 2/1945 | Hatherell | 75/114 X |
| 2,480,184 | 8/1949 | Erasmus | 75/113 X |
| 2,871,115 | 1/1959 | Agarwal | 75/3 |
| 3,235,371 | 2/1966 | Volin et al. | 75/3 |
| 3,318,685 | 5/1967 | Handwerk | 75/3 |
| 3,409,427 | 11/1968 | Bonnivard | 75/1 |
| 3,477,928 | 11/1969 | Coltrinari | 75/7 X |
| 3,482,964 | 12/1969 | Ishimitsu et al. | 75/3 X |

*Primary Examiner*—Allen B. Curtis
*Attorney*—Joseph J. O'Keefe

ABSTRACT: A process for treating iron ore pellets containing objectionably high contents of alkali, for example, about 0.25 percent to about 1.50 percent of sodium and/or potassium oxides. The process includes soaking the pellets in an aqueous solution of calcium chloride, drying the pellets and heating the pellets to reduce the alkali content to below about 0.15 percent. The pellets produced thereby are also described.

PROCESS FOR PRODUCING IRON ORE PELLETS OF LOW ALKALI CONTENT AND CONTAINING FLUX MATERIAL

BACKGROUND OF THE INVENTION

Many iron ore deposits contain nonferrous metal values, for example vanadium and chromium, as impurities. These ores are attractive sources of the nonferrous metal values which values may be extracted therefrom by several known methods. One method is referred to as the soda roast and leaching method. The nonferrous metal-containing iron ore is mixed with an alkaline compound, for example, soda ash and formed into balls. The balls are roasted during which process the balls are hardened. The hardened balls, now called pellets, are then subjected to leaching steps during which the nonferrous metal, in the form of a water-soluble sodium compound, is removed from the pellets. Unfortunately, the soda roast-leaching method leaves a residue of alkali, for example, sodium and/or potassium, in the pellets. The alkali content of the pellets may thus be increased to between about 0.25 percent and 1.50 percent. This results in pellets which are weaker than standard pellets and are difficult to transport and charge to a blast furnace because they disintegrate, producing a high percentage of fines. The high alkali content is also objectionable because at high temperatures prevalent in the blast furnace the alkali will vaporize and pass out of the pellets and attack the refractory lining in the blast furnace, thereby decreasing the life of the lining.

It is the primary object of this invention to provide iron ore pellets containing a flux material and less than objectionable amounts of alkali, said pellets being characterized by having improved crushing strength and resistance to abrasion.

It is also an object of this invention to provide a process for reducing the alkali content of roasted and leached iron ore pellets whereby said pellets are made suitable for charging into a blast furnace.

SUMMARY OF THE INVENTION

Broadly, the pellets of the invention contain a flux material and less than an objectionable amount of an alkali, are characterized by having improved crushing strength and resistance to abrasion. The pellets are produced by soaking them in an aqueous solution of calcium chloride, drying the pellets, and heating the pellets to cause a reaction whereby a substantial portion, but not necessarily all, of the alkali is removed from the pellets.

DESCRIPTION OF THE PREFERRED EMBODIMENT

Iron ore pellets containing about 0.25 percent or more of an alkali, for example, $Na_2O$, may be treated to reduce the alkali content therein to below about 0.15 percent. Pellets containing not more than 0.15 percent alkali, for example sodium oxide, are suitable charge material for a blast furnace. The pellets are treated by soaking them in an aqueous solution of calcium chloride for a time sufficient to impregnate the pellets with calcium chloride. After a sufficient time the pellets are removed from the solution. They are then heated to a temperature of about 2,000° F. to about 2,450° F. for a time sufficient to cause a reaction between the alkali and the calcium chloride, to volatilize the reaction product thus formed and to harden the pellet. It is thought that an alkali chloride and a flux, for example sodium chloride and calcium oxide respectively, are formed. The chloride vaporizes and passes off as a gas and the flux remains in the pellet as shown in the following reactions:

$$Na_2O + CaCl_2 \xrightarrow{\Delta} 2\,NaCl\uparrow + CaO$$
$$K_2O + CaCl_2 \xrightarrow{\Delta} 2\,KCl\uparrow + CaO$$

The pellets are held at the desired temperature for a time sufficient to reduce the alkali content therein to below about 0.15 percent and an amount of the flux, CaO, about equivalent to the calcium chloride added is deposited therein. Pellets treated by the process of the invention have a low alkali content and contain a flux and are further characterized by having improved crushing strength and resistance to abrasion when compared to some roasted and leached pellets containing 0.25 percent or more of an alkali and not so treated.

Iron ore which has been balled with soda ash, roasted and leached to extract nonferrous metals therefrom and which contains as much as 1.5 percent sodium oxide after leaching has been successfully treated by the process of the invention to produce stronger pellets containing below about 0.15 percent sodium oxide. The leached pellets are soaked in the aqueous solution of calcium chloride. The solution may be as dilute as 21 percent and as concentrated as 46 percent. It must be understood that the removal of alkali is dependent upon the concentration of the calcium chloride solution. If leached pellets contain a large amount of alkali, for example, 0.60 percent, then the aqueous solution of calcium chloride must be more concentrated, for example, 30 percent, than that used for lower alkali contents. The pellets are heated within the temperature range of 2,000° F. to 2,450° F. for a time sufficient to remove the require amount of alkali to thereby reduce the alkali content in the leached pellets to below about 0.15 percent.

In this specification and claims wherever percentages are referred to, such percentages are by weight unless otherwise noted.

In a specific example of the invention a vanadium-bearing iron ore concentrate was balled with soda ash and roasted. The resultant pellets had the following chemical composition:

|  | Percent |
|---|---|
| $Fe_2O_3$ | 64.3 |
| V | 0.30 |
| $SiO_2$ | 1.3 |
| $Al_2O_3$ | <0.10 |
| CaO | 0.2 |
| MgO | 0.3 |
| $Na_2O$ | 1.2 |

The pellets were water leached at 176° F. (80° C.) for 7 hours. The pellets were then divided into lots A and B. Lot A was dried. Lot B was soaked in a 31 percent aqueous solution of calcium chloride ($CaCl_2$) for 4 hours at 176° F. (80° C.), and treated at 2,350° F. (1,287.7° C.) for one-half hour. The chemical composition of the treated pellets is noted below:

| Percent | $Fe_2O_3$ | V | $SiO_2$ | $Al_2O_3$ | CaO | MgO | $Na_2O$ |
|---|---|---|---|---|---|---|---|
| Lot: | | | | | | | |
| A | 67.7 | 0.19 | 1.3 | 0.08 | 0.2 | 0.3 | 0.61 |
| B | 67.4 | 0.20 | 1.4 | -------- | 1.7 | 0.3 | 0.13 |

The lots were then tested for crushing strength in a Tinius Olsen apparatus and were subjected to a tumble test to indicate their resistance to abrasion. The results are listed below:

| Lot | Crushing Strength p.s.i. | Tumble Test (+3 Mesh Index) (%) |
|---|---|---|
| A | 262 | 82.2 |
| B | 743 | 93.1 |

In another example of the invention a vanadium-bearing iron ore concentrate containing chromium, aluminum, silicon and titanium as impurities was balled with soda ash, dried and roasted. A typical chemical composition of the resultant pellets follows:

| | | | | |
|---|---|---|---|---|
| $Fe_2O_3$ (%) | — 63.1 | $Al_2O_3$ | (%) | — 2.9 |
| V (%) | — 0.52 | CaO | (%) | — 0.05 |
| Cr (%) | — 0.13 | MgO | (%) | — 0.72 |
| $TiO_2$ (%) | — 2.8 | $Na_2O$ | (%) | — 2.0 |
| $SiO_2$ (%) | — 1.5 | $K_2O$ | (%) | — 0.06 |

After water leaching the pellets had the following chemical composition:

| | | | | |
|---|---|---|---|---|
| $Fe_2O_3$ (%) | — 63.3 | $Al_2O_3$ | (%) | — 2.9 |
| V (%) | — 0.13 | | (%) | — 0.05 |
| Cr (%) | — 0.09 | MgO | (%) | — 0.72 |

| | | | | |
|---|---|---|---|---|
| $TiO_2$ (%) | — 2.7 | $Na_2O$ | (%) | — 1.1 |
| $SiO_2$ (%) | — 1.6 | $K_2O$ | (%) | — 0.06 |

The pellets were soaked in a 31 percent aqueous solution of $CaCl_2$ for 4 hours at 176° F. (80° C.), drained and treated at 2,350° F. for one-half hour. The chemical composition of the pellets after treatment follows:

| | |
|---|---|
| $Fe_2O_3$ (%) | — 62.2 |
| V (%) | — 0.12 |
| CaO (%) | — 1.69 |
| $Na_2O$ (%) | — 0.09 |
| $K_2O$ (%) | — <0.05 |

Note that the high content of $Na_2O$—1.1 percent in the leached pellets has been reduced to 0.09 percent by the process of the invention.

I claim:

1. An improved process for reducing the alkali content of pellets produced from iron ore containing nonferrous metal values and which contain more than 0.25 percent alkali, which iron ore has been balled, roasted with an alkali compound and leached to extract said nonferrous metal values therefrom, said process comprising soaking the roasted and leached pellets in an aqueous solution of calcium chloride to impregnate the pellets with calcium chloride and heating the impregnated pellets at a temperature and for a time sufficient to reduce the alkali content to below about 0.15 percent by weight.

2. A process as claimed in claim 1 in which the alkali removed is sodium.

3. A process as claimed in claim 1 in which the alkali removed is potassium.

4. A process as claimed in claim 1 in which the pellets are heated to within a temperature range of about 2,000° F. to about 2,450° F.

5. An improved process for reducing the alkali content of pellets produced from iron ore containing nonferrous metal values and which contain more than about 0.25 percent alkali, which iron ore has been balled, roasted with an alkali compound and leached to extract said nonferrous metal values therefrom, said process comprising soaking the roasted and leached pellets in an aqueous solution of calcium chloride and heating the impregnated pellets at a temperature and for a time sufficient to reduce the alkali content to below about 0.15 percent by weight and to cause a flux material to form in the pellets.

6. A process as claimed in claim 1 in which the aqueous solution of calcium chloride contains from about 21 percent to about 46 percent calcium chloride.

7. A process as claimed in claim 5 in which the aqueous solution of calcium chloride contains from about 21 percent to about 46 percent calcium chloride.

* * * * *

UNITED STATES PATENT OFFICE
CERTIFICATE OF CORRECTION

Patent No. 3,615,342                    Dated    October 26, 1971

Inventor(s)     Conrad B. Bare

It is certified that error appears in the above-identified patent and that said Letters Patent are hereby corrected as shown below:

Column 2, line 74, second column, underneath "$Al_2O_3$" insert -- CaO --.

Signed and sealed this 18th day of April 1972.

(SEAL)
Attest:

EDWARD M. FLETCHER, JR.                 ROBERT GOTTSCHALK
Attesting Officer                       Commissioner of Patents